United States Patent
Petrov

(10) Patent No.: US 9,742,253 B2
(45) Date of Patent: Aug. 22, 2017

(54) POWER SUPPLY AND CONTROL CIRCUIT FOR MOTOR-DRIVEN CONVEYING ROLLERS

(71) Applicant: Dimitar Petrov, Sofia (BG)

(72) Inventor: Dimitar Petrov, Sofia (BG)

( * ) Notice: Subject to any disclaimer, the term of this patent is extended or adjusted under 35 U.S.C. 154(b) by 0 days.

(21) Appl. No.: 15/115,233

(22) PCT Filed: Feb. 6, 2014

(86) PCT No.: PCT/BG2014/000005
§ 371 (c)(1),
(2) Date: Jul. 28, 2016

(87) PCT Pub. No.: WO2015/113121
PCT Pub. Date: Aug. 6, 2015

(65) Prior Publication Data
US 2016/0352205 A1    Dec. 1, 2016

(30) Foreign Application Priority Data

Jan. 29, 2014    (BG) ........................ 111686

(51) Int. Cl.
*B65G 13/06*    (2006.01)
*H02K 29/06*    (2006.01)
(Continued)

(52) U.S. Cl.
CPC ............. *H02K 29/06* (2013.01); *B65G 23/08* (2013.01); *H02K 5/225* (2013.01); *H02K 11/21* (2016.01); *H02P 6/16* (2013.01)

(58) Field of Classification Search
CPC ........ H02K 29/06; H02K 11/21; B65G 23/08; B65G 13/06; B65G 13/00; B65G 13/02; B65G 13/04

(Continued)

(56) References Cited

U.S. PATENT DOCUMENTS 5,462,156 A * 10/1995 Kobayashi ............. B65G 23/08
198/780
5,905,366 A    5/1999 Wilson
(Continued)

FOREIGN PATENT DOCUMENTS

DE    102008047494 A1    4/2010

OTHER PUBLICATIONS

European Patent Office, International Search Report issued in International Application No. PCT/BG2014/000005 mailed Jul. 6, 2015, 3 pages.

*Primary Examiner* — Antony M Paul
(74) *Attorney, Agent, or Firm* — Wood Herron & Evans LLP

(57) ABSTRACT

The invention is intended for industry as component of cargo conveyors. In it the relevant commutation electronics is located outside the roller body. The invention provides that only four wires pass through the axial element for easy assembling, using four-terminal connectors. Roller (1) has a hollow body (3), in which an electric motor (4) is located, coupled to the body by driving and torque transferring (5). A cable (6) with terminals (7) from the coils (8) of the motor (4) and a first-potential terminal (9) powers the position sensors (10). Power to sensors is applied by first (9) and second-potential (12). The sensor signal terminals (11) are connected to a digital encoding device (17), powered by the first (9) and second (12) potential. This encoding device has one common encoded output (19) connected to the first potential terminal (9).

4 Claims, 3 Drawing Sheets

(51) Int. Cl.
  *B65G 23/08*    (2006.01)
  *H02P 6/16*    (2016.01)
  *H02K 5/22*    (2006.01)
  *H02K 11/21*    (2016.01)

(58) Field of Classification Search
  USPC ............ 318/34, 652, 661, 400.01, 700, 721,
      318/400.37, 400.38, 400.39, 727;
    198/300, 321, 330, 788; 310/12.11, 12.21
  See application file for complete search history.

(56)       References Cited

U.S. PATENT DOCUMENTS

| | | |
|---|---|---|
| 6,710,505 B1 | 3/2004 | Barani et al. |
| 2004/0108189 A1 | 6/2004 | Itoh et al. |
| 2012/0312663 A1 | 12/2012 | Schmidt et al. |

* cited by examiner

POWER SUPPLY AND CONTROL CIRCUIT FOR MOTOR-DRIVEN CONVEYING ROLLERS

TECHNICAL FIELD

The invention relates to a power supply and control circuit for a motor-driven conveying roller, which will find a broad application in industry, and more specifically as a major component of conveyors designed for conveying various cargo and/or products.

BACKGROUND ART

It is known from EP 1671901 that there exists a circuit for the supply of power and for controlling of a conveyor roller, driven by an electric motor, which circuit includes a hollow body, in which an electric motor is located, and where the hollow body rotates on an axis. The electric motor is coupled to the roller body by components used to drive the said roller body and to transfer torque, and by a power supply cable supplying power to the electric motor, and by at least two, and preferably three position sensors. An electronic commutation device is also provided, which electronic device may be incorporated in the roller or in the electric motor, or may be an external device. The position sensors are designed to generate signals related to the position of the stator in relation to the position of the rotor of the electric motor. The used electric motor is of the brushless three-phase type with an internal rotor. The bearing element of the electric motor, which represents a hollow shaft component, usually is integrated with a cable and a connector. The connector is designed to connect the electric motor to the control device. The connector incorporates three connecting terminals to the coils, two terminals for supplying power to the position sensors, as well as one output signal terminal for each position sensor. Thus, the number of terminals used in the connector amounts to eight, which is exceptionally impractical and results in a number of deficiencies of the known conveying roller driven by an electric motor; these deficiencies are related to difficult assembly and a lack of assembly space. Thus, in a version using an external commutation device, the main deficiency is related to limitations on the selection of the power output of the electric motor depending on the thickness of the power supply wires and the large number of terminals, as described above and to the maximum admissible assembly orifice for the assembly of the hollow shaft component of the bearing element of the electric motor to the supporting element of the conveyor. With the option with an internal commutation device, higher operational loads result in the transfer of a substantial quantity of heat into the roller body from the electric motor located therein, which heat cannot be discharged to a sufficient degree because of the encapsulation of the roller. This substantially limits the admissible operational loads.

It is known from U.S. Pat. No. 6,710,505 B1 a power supply and control circuit for a motor-driven conveying roller, where the conveying roller incorporates a hollow body of the roller rotating on an axis, in which hollow body an electric motor is incorporated and coupled to the hollow body of the roller by elements for driving the roller body and for the transfer of torque. In this body a cable is also incorporated with respective terminals, connected to a connector, from the coils of the electric motor. There is one first potential terminal for supplying power to the included position sensors with signal outputs and the number of position sensors with signal outputs may be at least one, which position sensors are supplied with power from the first potential terminal, There is one more signal output—to provide a signal to the controller when a roller is stuck. So, the number of terminals used in the connector amounts to minimum five, but they are usually seven, which is impractical and results in deficiencies are related to difficult assembly and a lack of assembly space. The deficiencies highlighted above apply also to this known solution, which deficiencies are related to limitations on the selection of the power output of the electric motor and to the maximum admissible assembly orifice for the assembly of the hollow shaft component of the bearing element of the electric motor to the supporting element of the conveyor, It is known from the DE 10 2008 047 494 a power supply and control circuit for DC motor in particular for an electronically controlled brake system. It includes the phase windings electrically powered via a inverter circuit, In order to match vote rotation and speed between the rotor and spin boxes in the phase windings and for a secured start-up under load, the stator incorporates three rotation sensors, which scan the rotor. These sensors outputs are connected via a common line to a downstream common control, and thus phase-shifted output signals for further processing in a downstream common control is emitted. The output signals of the rotation sensors commute according to the rotor behaviour periodically between a high level and a low level. The outputs of rotation sensors are connected to a known electrical resistance. All rotation sensors are connected parallel to each other and, as group, are connected to a star point S of the phase windings to provide electric power of the rotation sensors. In order to stabilize the supply of the rotation sensors, they are connected upstream of at least one R/C element within the formed supply circuit, and the additional electrical resistance generates a voltage drop in order to adapt each phase voltage to the required supply voltage of about 5V. Furthermore, a Zener diode, connected to ground and correspondingly is included after the electrical resistance connected to the rotation sensors.

This known solution has a very specific application and may not be, used for power supply and control circuit for a motor-driven conveying roller, as it includes a substantial number of components used for specific purposes outside the sphere of application in conveyors, and moreover the electric circuits to and from the sensors may not be directly applied to the power supply circuit of the roller as they make the problem with the limited assembly space even more complex. In addition, the status of the rotation sensors is encoded as electrical resistance (analog coding) and requires additional space.

SUMMARY OF THE INVENTION

The problem to be solved by the invention is to create a circuit for power supply and, control of a conveying roller driven by an electric motor, which would allow the use of high-power electric motors while the dimensions of the rollers and of the bearing and connecting elements remain unchanged.

The problem is solved by a power supply and control circuit for a motor-driven conveying roller, where the conveying roller incorporates a hollow body of the roller rotating on an axis. In the hollow body an electric motor is incorporated and coupled to the interior of the hollow body of the roller by elements driving the roller body and transferring torque. In the hollow body a cable is also incorporated with the respective terminals, connected to the connector, from the coils of the electric motor, and with one terminal for first potential for supplying power to the position sensors with signal outputs. The number of position sensors with signal outputs may be at least one. According to the invention, position sensors are supplied with power from the first potential terminal and by the second potential, This second potential is generated by an additional circuitry, connected to at least one of the coils of the electric motor with the objective to provide for the second potential. It is provided for the output signals of the position sensors to be connected to a digital encoding device, supplied with power by the first and by the second potential, which digital encoding device has one common encoded signal output, connected to the first potential used for supplying power to the position sensors. The electric characteristics of the first potential are changed by the encoded signal.

The circuitry used to generate the second potential includes at least one rectifying element.

The encoded signal generates information from the position sensors as well as additional information about the characteristics of the motor, in the digital encoding device.

The advantages of the invention are that the power supply for the position sensors as well as the specific manner of connection of the digital encoding device allows the electronics, required for controlling and commutation of the motor, to be located outside the roller body using a connector with a smaller number of terminals, thus removing the electronic circuit out of the temperature influence of the electric motor, This allows both higher operational loads and eases the cooling of the electronics. According to the invention, it becomes possible to pass through the hollow shaft component of the conveying roller only four wires—the three phases of the electric motor and one power supply terminal to the position sensors—thus assuring the application of widely used four-terminal connectors and an easier assembly. Position sensors data, additional data about temperature and operational data is digitally transmitted over the fourth wire,

DESCRIPTION OF THE EMBODIMENTS

Figure 1:
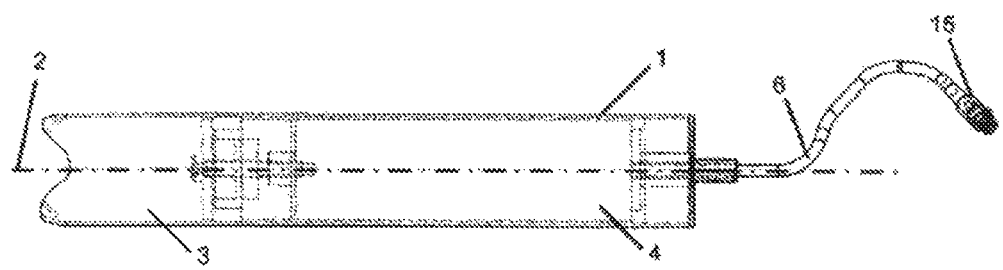
FIG. 1 represents a partial general view of the conveying roller powered according to the present invention.
Figure 2:
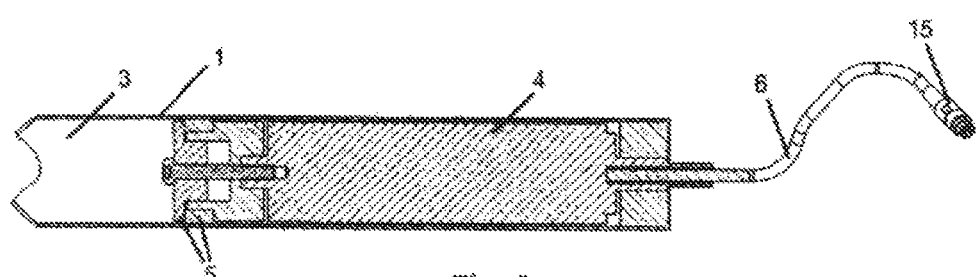
FIG. 2—a longitudinal section of the conveying roller shown on FIG. 1.

A power supply and control circuit for a motor-driven conveying roller; which circuit includes a hollow body 3 of the roller 1, rotates on the axis 2, in which hollow body 3 an electric motor 4 is located as shown on FIG. 1 and, FIG. 2. The electric motor 4 is coupled to the interior of the hollow body 3 of the roller 1 by elements 5 for driving the roller body and transferring torque. A cable 6 is provided, fitted with connector 15, to which the respective terminals 7 of the coils 8 of the electric motor 4 are connected together with one terminal for a first potential 9, used to supply power to the position sensors 10, as shown on FIG. 3 to FIG. 6. The provided position sensors 10 have signal outputs 11. According to the invention the number of position sensors 10 with signal outputs 11 may be at least one, The position sensors 10 are supplied with power from the first potential 9 and second potential 22 terminals, where the said second potential is generated by an additional circuitry 12, used to provide the second potential and connected to at least one of the coils 6 of the electric motor 4. The electric motor 4 may be selected out of the known types—brushless, with two or more coils.

Figure 3:
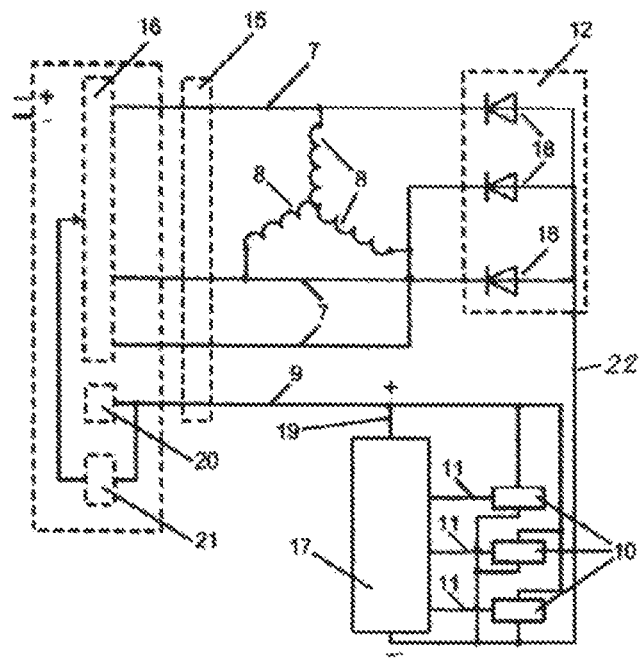
FIG. 3—general power supply and control circuit diagram of a brushless electric motor of a conveying roller, according to this invention.
Figure 4:
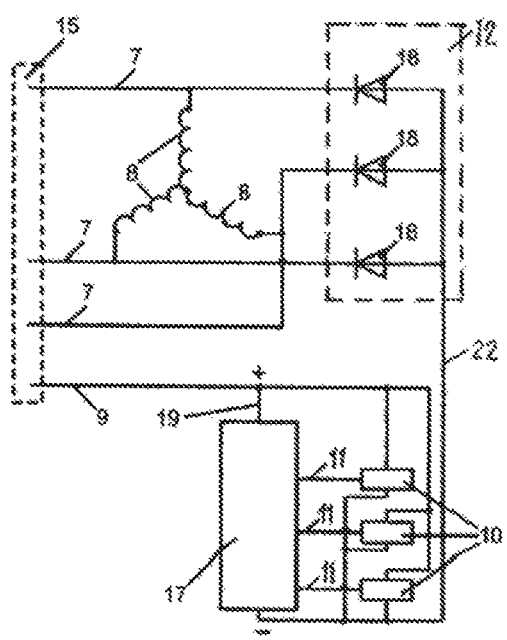
FIG. 4—example for creating a second negative potential for supplying Power is the position sensors from the three coils of the electric motor.
Figure 5:
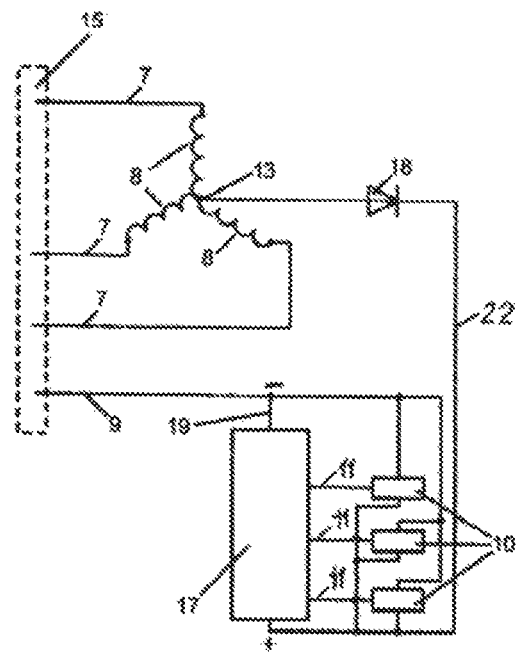
FIG. 5—example for creating a second positive potential for supplying power to the position sensors from the common point of the coils of the electric motor.
Figure 6:
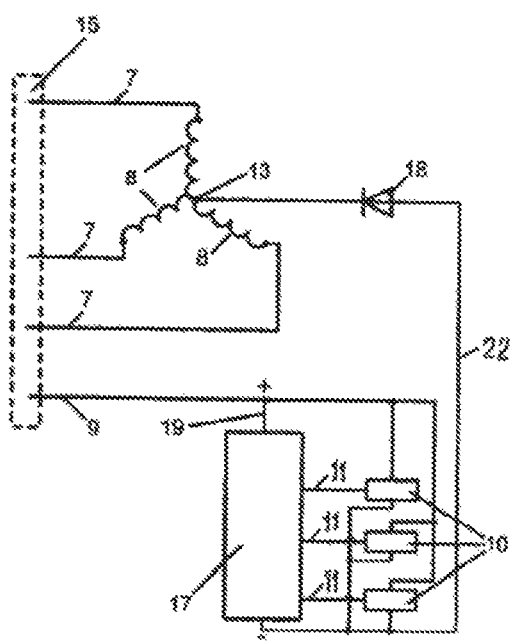
FIG. 6—example for creating a second negative potential for supplying power to the position sensors from the common point of the coils of the electric motor.

The second potential 22 may be generated by the terminals 7 of the coils 8 of the electric motor 4, as shown of FIG. 3 and FIG. 4, or from the common point 13 of these coils 8, as shown on FIG. 5 and FIG. 6.

According to this invention, the second potential 22, together with the first potential 9, is used to supply power to the position sensors 10. The position sensors 10 may be of various types, for instance Hall-effect sensors, solid magnetic resistors, as well as optical, capacitance, laser or other sensors, suitable for this purpose.

According to the preferred embodiment of the invention, the signal outputs 11 of the position sensors 10 are connected to a digital encoding device 17, supplied with power by the first 9 and second 22 potential, where the second potential 22, as shown above, is generated by the additional circuitry 12, connected to at least one of the coils 8 of the electric motor 4 with the purpose to provide second potential 22, This is illustrated on fig, 3 and on FIG. 4 to FIG. 6. The digital encoding device 17 has one common encoded signal output 19, connected to the terminal of the first potential terminal 9 used to supply power to the sensors 10 and that the electric characteristics of the first potential 9 are changed by the encoded signal. Various methods—amplitude, frequency, phase, synchronous or asynchronous encoding—may be used in the digital encoding device 17 for encoding and superimposing the signal on the first potential.

The number of terminals, which must be connected to the connector 15 for establishing a link to the external commutation device 16 is substantially reduced by connecting the signal outputs 11 from the position sensors 10 to the digital encoding device 17. Thus, even if three position sensors 10 are used, the total number of terminals, provided for connecting to connector 15 is four, including the three terminals 7 from the cods 8 of the electric motor 4.

It is suitable to have the circuitry 12 providing a second potential 22 include at least one rectifying element 18, as illustrated on FIG. 3 to FIG. 6, The rectifying elements 18 may be diodes, transistors or other components known and used by person skilled in the art. According to this invention, the encoded signal generates information about the position sensors, as well as additional information about the electric motor characteristics.

The options to create a second potential 22 are illustrated in more details on FIG. 3 to FIG. 6. Thus, for instance, the creation of a negative second potential 22 for supplying power to position sensors 10 is shown on FIG. 3 and FIG. 4. This negative potential is formed under the condition that the external commutation device 16 allows at any time connecting to a "minus" terminal of at least one of the coils 8 of the electric motor 4. At that, the first potential 9 supplied through connector 15 is positive. There are three rectifying elements 18 connected to each of the coils 8 of the electric motor 4 in this example.

It is possible to create a positive second potential 22 for supplying power to position sensors 10 by using a single rectifying element 18, connected to the common point of the coils 8 of the electric motor, as shown on FIG. 5. This positive second potential 22 is created under the condition that the external commutation device 16 provides continuous commutation of at least two of the coils 8 of the electric motor 4. At that, the first potential 9 supplied through connector 15 is negative.

The creation of a negative second potential 22 for supplying power to position sensors 10 by using a single rectifying element 18, connected to the common point of the coils 8 of the electric motor, as shown on FIG. 6. This negative potential 22 is created under the condition that the external commutation device 16 provides continuous commutation of at least two of the coils 8 of the electric motor 4. At that, the first potential 9 supplied through connector 15 is positive.

The invention operates as follows:

After the external commutation device 16 is powered up it applies voltage of the respective polarity—positive according to FIG. 3—to the first potential terminal 9 connected to the connector 15. The voltage with the polarity required to form the second potential 22—negative according to FIG. 3—is applied through the commutation device 16 to at least one of the coils 8 of the electric motor 4. The first potential 9 and the second potential 22, generated in this manner, supply power to the position sensors 10 and to the digital encoding device 17. The digital encoding device 17 starts operating and transfers the information from the position sensors 10, as well as the additional information, to the encoding device 17 by superimposing the digital signal on the first potential 9.

Thus, the superimposed signal is decoded, through the power supply unit 20 and the decoding device 21 connected to the external commutation device 16, and the decoded information from the position sensors 10 is used for commutation of the voltage applied to the coils 8 of the electric motor 4 in order to initiate the motor's rotation. The additional information transmitted by the digital encoding device 17 to the commutation device 16 is used for diagnostic purposes.

An example of such additional information is the temperature inside the body of the motor and the conveying rollers.

The invention claimed is:

1. A power supply and control circuit for a motor-driven conveying roller, where the conveying roller incorporates a hollow body of the roller rotating on an axis, in which hollow body an electric motor is incorporated and coupled to the hollow body of the roller by elements for driving the roller body and for the transfer of torque, in which body a cable is also incorporated with the respective terminals, connected to a connector, from the coils of the electric motor, and with one first potential terminal for supplying power to the included position sensors with signal outputs that the number of position sensors with signal outputs may be at least one, which position sensors are supplied with power from the first potential terminal, characterized by that a second potential (22), generated by an additional circuitry (12), connected to at least one of the coils (8) of the electric motor (4) with the objective to provide for the second potential (22) and the output signals (11) from the position sensors (10) are connected to a digital encoding device (17), supplied with power from the first (9) and the second potential (22), which digital encoding device (17) has one common encoded signal output (19), connected to the first potential (9) used for supplying power to the position sensors (10), and that the electric characteristics of the first potential (9) are changed by the encoded signal.

2. A power supply and control circuit according to claim 1, which is characterized by that the circuitry (12) used to generate the second potential (22) includes at least one rectifying element (18).

3. A power supply and control circuit according to claim 2, characterized by that that the encoded signal generates information about the position sensors (10), as well as additional information relevant to the characteristics of the electric motor (4), in the digital encoding device (17).

4. A power supply and control circuit according to claim 1, characterized by that the encoded signal generates information about the position sensors (10), as well as additional information relevant to the characteristics of the electric motor (4), in the digital encoding device (17).

* * * * *